US012668951B2

(12) United States Patent
Davis

(10) Patent No.: US 12,668,951 B2
(45) Date of Patent: Jun. 30, 2026

(54) SEARCHABLE INTEGRATION OF GEOSPATIAL BASED INFORMATION WITH CAPTURED IMAGES DURING WORKSITE OPERATIONS

(71) Applicant: Deere & Company, Moline, IL (US)

(72) Inventor: Travis J. Davis, Polk City, IA (US)

(73) Assignee: Deere & Company, Moline, IL (US)

( * ) Notice: Subject to any disclaimer, the term of this patent is extended or adjusted under 35 U.S.C. 154(b) by 380 days.

(21) Appl. No.: 18/299,374

(22) Filed: Apr. 12, 2023

(65) Prior Publication Data

US 2024/0344299 A1 Oct. 17, 2024

(51) Int. Cl.
*E02F 9/26* (2006.01)
*E02F 9/20* (2006.01)
*G06F 16/587* (2019.01)

(52) U.S. Cl.
CPC .............. *E02F 9/261* (2013.01); *E02F 9/205* (2013.01); *E02F 9/2054* (2013.01); *G06F 16/587* (2019.01)

(58) Field of Classification Search
CPC ......... E02F 9/261; E02F 9/205; E02F 9/2054; G06F 16/587
USPC ........................... 701/50, 408, 25, FOR. 107
See application file for complete search history.

(56) References Cited

U.S. PATENT DOCUMENTS 6,282,317 B1 8/2001 Luo et al.
7,035,461 B2 4/2006 Luo et al.

7,610,122 B2 10/2009 Anderson
7,680,340 B2 3/2010 Luo et al.
7,860,320 B2 12/2010 Luo et al.
8,520,897 B2 8/2013 Boncyk et al.
8,712,144 B2 4/2014 Mas et al.
8,855,405 B2 10/2014 Mas et al.
8,965,104 B1 2/2015 Hickman et al.
9,158,789 B2 10/2015 Garrett et al.
9,213,905 B2 12/2015 Lange et al.
9,642,305 B2 5/2017 Nykamp et al.

(Continued)

OTHER PUBLICATIONS

Extended European Search Report and Written Opinion issued in European Patent Application No. 24162723.1 dated Sep. 18, 2024, in 07 pages.

*Primary Examiner* — Scott A Browne
(74) *Attorney, Agent, or Firm* — Gary L. Montle; Lucian Wayne Beavers; Patterson Intellectual Property Law, PC

(57) ABSTRACT

A computer-implemented system and method provide for searchable integration of operating images and geospatial data, particularly for agricultural field operations or construction worksites in which visual images may be captured by work vehicles during normal operation rather than requiring specific trips by employees or agronomists. Captured images are uploaded from sensors associated with a work vehicle traversing a work area, along with associated geospatial data, to a remote data storage device via a communications network. The uploaded images and geospatial data are selectively correlated with respect to a geospatial map. Responsive to user input corresponding to a selected one or more nodes in the geospatial map, at least one of the uploaded images is identified as corresponding to the selected one or more nodes. A display is generated representing the identified at least one of the uploaded images on a display unit associated with the received user input.

20 Claims, 3 Drawing Sheets

154

(56) References Cited

U.S. PATENT DOCUMENTS

| | | | |
|---|---|---|---|
| 9,797,980 B2 | 10/2017 | Smitherman | |
| 9,813,512 B2 | 11/2017 | Wilbur et al. | |
| 10,019,790 B2 | 7/2018 | Bonefas et al. | |
| 10,401,501 B2 | 9/2019 | Wood | |
| 10,453,165 B1 | 10/2019 | Kostov et al. | |
| 10,474,926 B1 | 11/2019 | Dirac et al. | |
| 10,733,752 B2 | 8/2020 | Hageman et al. | |
| 10,762,605 B2 | 9/2020 | Chui et al. | |
| 10,896,327 B1* | 1/2021 | Lablans | G06V 10/25 |
| 11,178,818 B2 | 11/2021 | Brammeier et al. | |
| 11,234,366 B2 | 2/2022 | Darr et al. | |
| 11,240,961 B2 | 2/2022 | Anderson et al. | |
| 11,479,262 B2 | 10/2022 | Harrison | |
| 2010/0194886 A1 | 8/2010 | Asari et al. | |
| 2013/0116883 A1 | 5/2013 | Kormann | |
| 2016/0086032 A1* | 3/2016 | Pickett | G06V 20/188 |
| | | | 382/110 |
| 2017/0009578 A1 | 1/2017 | Barimani et al. | |
| 2017/0233955 A1 | 8/2017 | Berning et al. | |
| 2018/0027179 A1* | 1/2018 | Matsuzaki | B60R 1/27 |
| | | | 348/38 |
| 2018/0120133 A1 | 5/2018 | Blank et al. | |
| 2018/0165833 A1 | 6/2018 | Inoue et al. | |
| 2019/0061623 A1 | 2/2019 | Borkowski | |
| 2019/0174666 A1 | 6/2019 | Manternach | |
| 2020/0019778 A1 | 1/2020 | Frei et al. | |
| 2020/0029488 A1* | 1/2020 | Bertucci | G06F 18/2113 |
| 2020/0202127 A1 | 6/2020 | Chen et al. | |
| 2020/0379479 A1 | 12/2020 | Dima et al. | |
| 2021/0231453 A1 | 7/2021 | Colosky et al. | |
| 2021/0243936 A1 | 8/2021 | Vandike et al. | |
| 2021/0289701 A1 | 9/2021 | White et al. | |
| 2021/0337729 A1 | 11/2021 | O'Connor et al. | |
| 2022/0113729 A1 | 4/2022 | Vandike et al. | |

* cited by examiner

SEARCHABLE INTEGRATION OF GEOSPATIAL BASED INFORMATION WITH CAPTURED IMAGES DURING WORKSITE OPERATIONS

BACKGROUND

The present disclosure relates to the capturing of images by work vehicles while traversing a work area and in the course of operations, and further to the searchable integration of such images with geospatial based information in the context of a map having selectable locations. The present disclosure more particularly relates to the retrieval and display of correlated images and/or geospatial based information based on user selection with respect to the map locations.

BRIEF SUMMARY

The current disclosure provides an enhancement to conventional geospatial information gathering and representing techniques, at least by implementing existing activities that occur at an agricultural field operation or a construction worksite in which visual images would ideally be taken by work vehicles during their standard operating practice rather than requiring specific trips by employees or agronomists. Captured and properly categorized images may be used as context by the farm manager or agronomist to see detailed information regarding the health, weed pressure, or growth stage of the crops in an area. For a construction worksite, seeing visual information helps give context to the manager as to the true status of the worksite.

Systems and methods as disclosed herein may for example further store the captured images with geospatial data either in parallel and stored as metadata, or by embedding this geospatial information with respect to the actual image. Once these images and geospatial information can be effectively linked together, the front end user interaction solution that the managers work with can now execute detailed searches based on this geospatial information. If the user selects an area of interest for this map, the front end user interaction solution (web based as one example), would be able to identify the closest location(s) and share the image(s) that would have been uploaded from one or more work vehicles that are continually capturing images and corresponding data as it progresses through the field or worksite.

According to a first embodiment, a computer-implemented method is provided for searchable integration of operating images and geospatial data. The method comprises: uploading captured images from one or more sensors associated with a work vehicle traversing a work area, along with associated geospatial data, to a remote data storage device via a communications network; selectively correlating the uploaded images and geospatial data with respect to a geospatial map; responsive to user input corresponding to a selection of one or more nodes in the geospatial map, identifying at least one of the uploaded images corresponding to the one or more nodes; and generating a display representing the identified at least one of the uploaded images on a display unit associated with the received user input.

In one exemplary aspect according to the above-referenced first embodiment, one or more operations of the work vehicle are automatically controlled based at least in part on captured images from at least one of the one or more sensors.

In another exemplary aspect according to the above-referenced first embodiment, and optionally other above-referenced exemplary aspects thereof, the work vehicle may for example comprise a first work vehicle, wherein one or more operations of a second work vehicle traversing the work area are further automatically controlled based at least in part on the captured images from the at least one of the one or more sensors associated with the first work vehicle.

In another exemplary aspect according to the above-referenced first embodiment, and optionally other above-referenced exemplary aspects thereof, the geospatial data may comprise first information representing a location of the work machine when the associated at least one image was captured. The method may accordingly comprise: selectively generating a first display on the display unit representing an overhead view of at least the work area; identifying at least one location within the work area corresponding to the selected one or more nodes in the geospatial map; identifying at least one of the uploaded images corresponding to the identified at least one location; and generating a second display on the display unit corresponding to the identified at least one of the uploaded images.

In another exemplary aspect according to the above-referenced first embodiment, and optionally other above-referenced exemplary aspects thereof, the geospatial data may comprise second information representing a time when the associated at least one image was captured. The method may accordingly comprise identifying the at least one of the uploaded images corresponding to the identified at least one location and further in view of one or more predetermined temporal requirements.

In another exemplary aspect according to the above-referenced first embodiment, and optionally other above-referenced exemplary aspects thereof, the one or more predetermined temporal requirements may comprise a requirement of a most recent uploaded image corresponding to the identified at least one location, and/or a requirement of a most similar time with respect to seasonal and/or time of day attributes.

In another exemplary aspect according to the above-referenced first embodiment, and optionally other above-referenced exemplary aspects thereof, the geospatial data may comprise third information representing one or more material and/or terrain characteristics of the work area at the time when the associated at least one image was captured. The method may accordingly comprise identifying the at least one of the uploaded images corresponding to the identified at least one location and further in view of one or more attribute requirements.

In another exemplary aspect according to the above-referenced first embodiment, and optionally other above-referenced exemplary aspects thereof, the generated first display may comprise indicia representing respective material and/or terrain characteristics of one or more portions of the work area. The method may accordingly further comprise: identifying the at least one of the uploaded images as being nearest in location to the selected one or more nodes and further sharing at least one of the material and/or terrain characteristics of portions of the work area corresponding to the selected one or more nodes; and generating the second display on the display unit corresponding to the identified at least one of the uploaded images.

In a second embodiment as disclosed herein, a computer-implemented system is provided for searchable integration of operating images and geospatial data. One or more servers are functionally linked via a communications network to one or more work vehicles, and configured to direct the performance of steps in a method according to the first embodiment and optionally one or more of the exemplary aspects according thereto.

Numerous objects, features and advantages of the embodiments set forth herein will be readily apparent to those skilled in the art upon reading of the following disclosure when taken in conjunction with the accompanying drawings.

DETAILED DESCRIPTION

The implementations disclosed in the above drawings and the following detailed description are not intended to be exhaustive or to limit the present disclosure to these implementations. Any alterations and further modifications to the described devices, systems, methods, and any further application of the principles of the present disclosure are fully contemplated as would normally occur to one skilled in the art to which the disclosure relates. In particular, it is fully contemplated that the features, components, steps, or a combination thereof described with respect to one example may be combined with the features, components, steps, or a combination thereof described with respect to other examples of the present disclosure.

Figure 1:
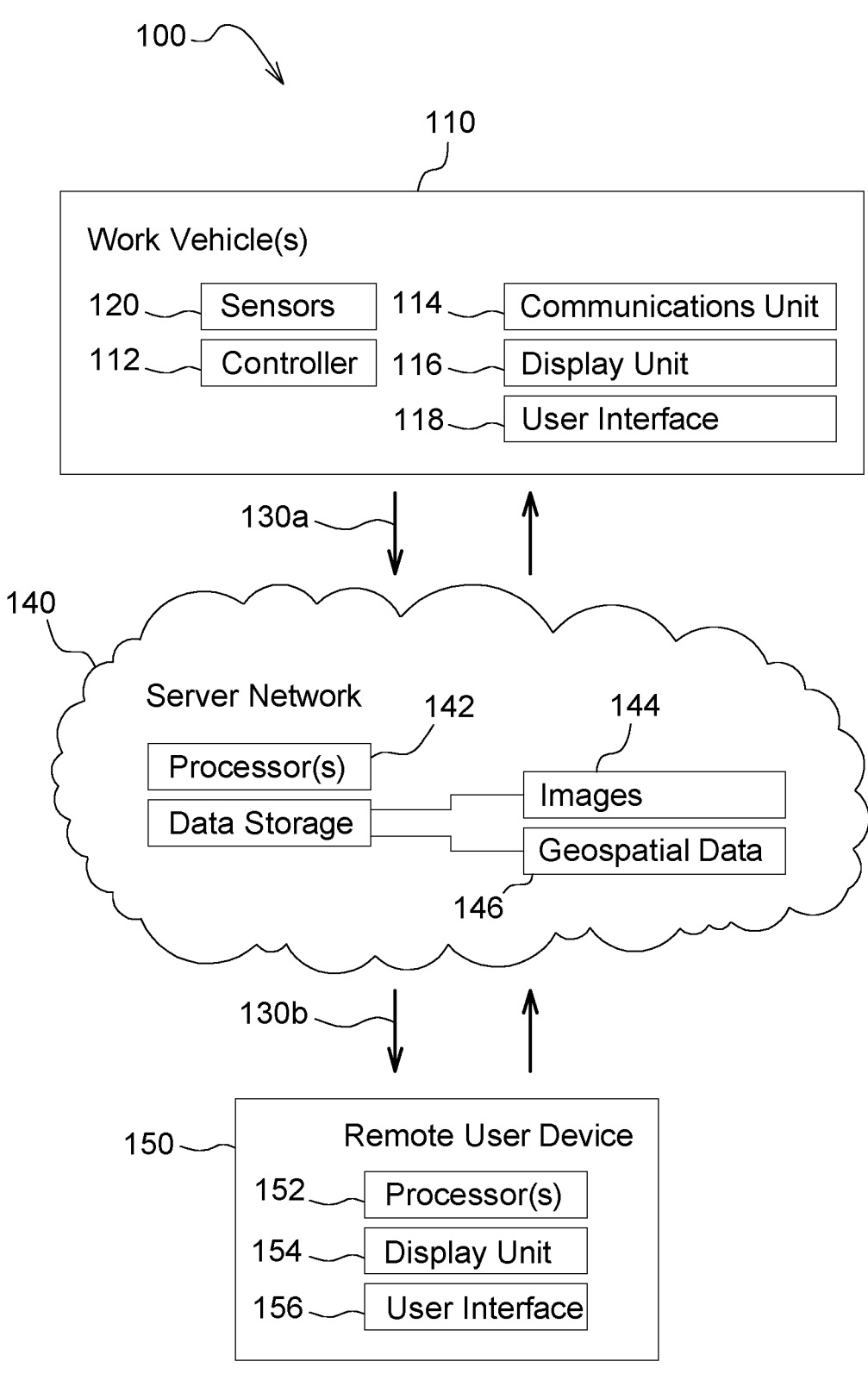
FIG. 1 is a block diagram representing an embodiment of a system as disclosed herein.

As represented in FIG. 1, a system 100 as disclosed herein may include one or more servers 140 (e.g., host data center), alone or in a networked arrangement, for example in a cloud computing environment, and configured to direct the performance of operations such as for example steps in a method as further described below. The one or more servers 140 are communicatively linked to one or more work vehicles 110, and further linked to one or more remote user computing devices 150, for example via respective communications networks 130a, 130b which may be the same or different in configuration. The system 100 may in some embodiments include the one or more of the work vehicles 110 or computer program products residing thereon, and/or one or more of the remote user computing devices 150 or computer program products residing thereon, and/or may merely comprise the one or more servers 140.

Various operations, steps or algorithms as described in connection with the one or more work vehicles 110, the one or more servers 140, and/or the one or more remote computing devices 150 can be embodied directly in hardware, in a computer program product such as one or more software modules executed by one or more of respective controllers 112 or processors 142, 152, or in a combination thereof. The computer program product can reside in one or more of data storage devices such as RAM memory, flash memory, ROM memory, EPROM memory, EEPROM memory, registers, hard disk, a removable disk, or any other form of computer-readable medium known in the art. An exemplary computer-readable medium can be coupled to a respective processor such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein at least with respect to processors 142, 152 may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

A work vehicle 110 for the purpose of the present disclosure may be a machine that travels, self-propelled or otherwise, through an area and captures perception data corresponding to its surroundings as part of, or otherwise to facilitate, a work operation. The term "operating images" as used herein in the context of images that are uploaded and subsequently displayed to end users may generally refer to perception data that is captured during or otherwise associated with operation of a work vehicle for, e.g., enhancing an operator's understanding of the surroundings, obstacle detection and avoidance, automated steering, automated work implement control such as for example adjustments to the position of a work vehicle attachment configured to engage the terrain or carry materials across the terrain, and/or the like. In various embodiments according to the present disclosure the same perception data, such as for example images used for the above-referenced functions or different images from the same perception sensors 120, may be utilized for transmitting the perception data to the one or more servers 140 via communications network 130a.

Illustrative but non-limiting examples of such a work vehicle 110 may include various types of work vehicles or machines in agriculture, construction, forestry, road building, and the like, unless otherwise specifically noted herein. For example, an agricultural sprayer may have a plurality of cameras arranged along the length of a rear-mounted or front-mounted boom, wherein images from the cameras may be used in a primary context to characterize the work vehicle surroundings for automated sprayer control within the work area, but in embodiments of the present disclosure the same images (or different images from one or more of the same cameras) may be utilized in a secondary context along with metadata provided or otherwise derived in association with the images.

In performing operations for each of the primary and secondary contexts noted above, a work vehicle 110 may include a controller 112, a communications unit 114, and the above-referenced one or more perception sensors (e.g., cameras) 120.

A controller 112 for this purpose may be a vehicle control unit associated with the work vehicle 110 or even external to the work vehicle 110 in such embodiments. A controller may be configured to analyze output data from the perception sensors 120, alone or in combination with other inputs, to generate display information for an operator on the display unit 116 and/or control one or more operations of the work vehicle and/or a work attachment coupled thereto. The controller 112 may further selectively transmit output data from the perception sensors 120 to the one or more servers 140 via the communications network 130a, for example pushed to the one or more servers 140 based on predetermined criteria for image transmission or responding to requests from the one or more servers 140. Exemplary predetermined criteria for selective transmission of images may include tolling of a predetermined amount of time between image transmission, determining that a captured image satisfies specified image resolution and/or content requirements, determining that a captured image is properly associated with one or more metadata requirements, etc.

A controller 112 may be embodied by or include a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general-purpose processor can be a microprocessor, but in the alternative, the processor can be a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The controller 112 may be further functionally linked to a user interface 118, itself including or otherwise linked to a display unit 116, for selectively displaying information to the operator, and further typically configured as or including an input device for receiving inputs from the operator. The display unit 116 and the input device may be collectively provided as a module with respect to a user interface 118, including for example a touchscreen to enable user manipulation and/or inputs corresponding to displayed elements. The controller 112 and user interface 118 may be discrete components, or may still further collectively be provided as parts of the same vehicle control unit. The controller 112 may further be functionally linked (via the user interface 118 or otherwise via discrete data connections) to receive inputs with respect various controls or user inputs (e.g., a steering wheel, joysticks, levers, buttons) for operating the work vehicle 110 and/or the associated implement. Such an onboard interface may be coupled to a control system via for example a CAN bus arrangement or other equivalent forms of electrical and/or electro-mechanical signal transmission. Another form of user interface 156 may take the form of a display that is generated on one of the above-referenced remote (i.e., not onboard) computing devices 150, for example as may be associated with an operator of the work vehicle 110, and which may display outputs such as status indications and/or otherwise enable user interaction such as the providing of inputs to the system.

The display unit 116 and/or user interface 118 may be configured to receive output signals from the controller 112 or directly from the perception sensors 120, for example to further display or otherwise implement such signals in the form of audio, visual, or audio-visual indicia for user review, manipulation, analysis, alerting, and the like.

In an embodiment, cameras 120 as work vehicle-mounted perception sensors 120 may be mounted on dedicated camera mounts, which may further be pivotable about at least one primarily vertical first axis. The orientation of one or more cameras 120 may accordingly in an embodiment be controllable to provide a field of view of the camera to be selectively adjusted about the first axis so that the field of view can be oriented in a desired, e.g. primarily forward facing, direction for a first operation (e.g., as inputs for work vehicle control functions) and selectively adjusted about the first axis so that the field if view can be oriented in a different direction as needed for a second operation (e.g., capturing images of the surroundings for transmittal to the one or more servers 140 as inputs to a geospatial map).

The cameras 120 may be functionally linked solely to the controller 112 associated with the work vehicle 110, or in some embodiments may be linked to the controller 112 for a first data transfer function and further via the communications network 130*a* to the one or more remote servers 140, and/or one or more remote computing devices 150, for a second data transfer function without the images being transmitted via the controller 112. The output signals from the cameras 120 may for example be provided directly to the controller 112 or via intervening components for analog-to-digital conversion and/or video interface (not shown).

The one or more servers 140 may include, in addition to the above-referenced processor(s) 142, data storage 148 functionally linked to the processor(s) and being configured to store thereon images 144 received from the work vehicles 110 and corresponding geospatial data 146. The geospatial data 146 may for example include or otherwise be derived from metadata provided from the work vehicle 110, such as for example a time and/or location of the image 144, or may be derived from processing of the images 144 to for example identify one or more characteristics of subject matter within the images.

Figure 2:
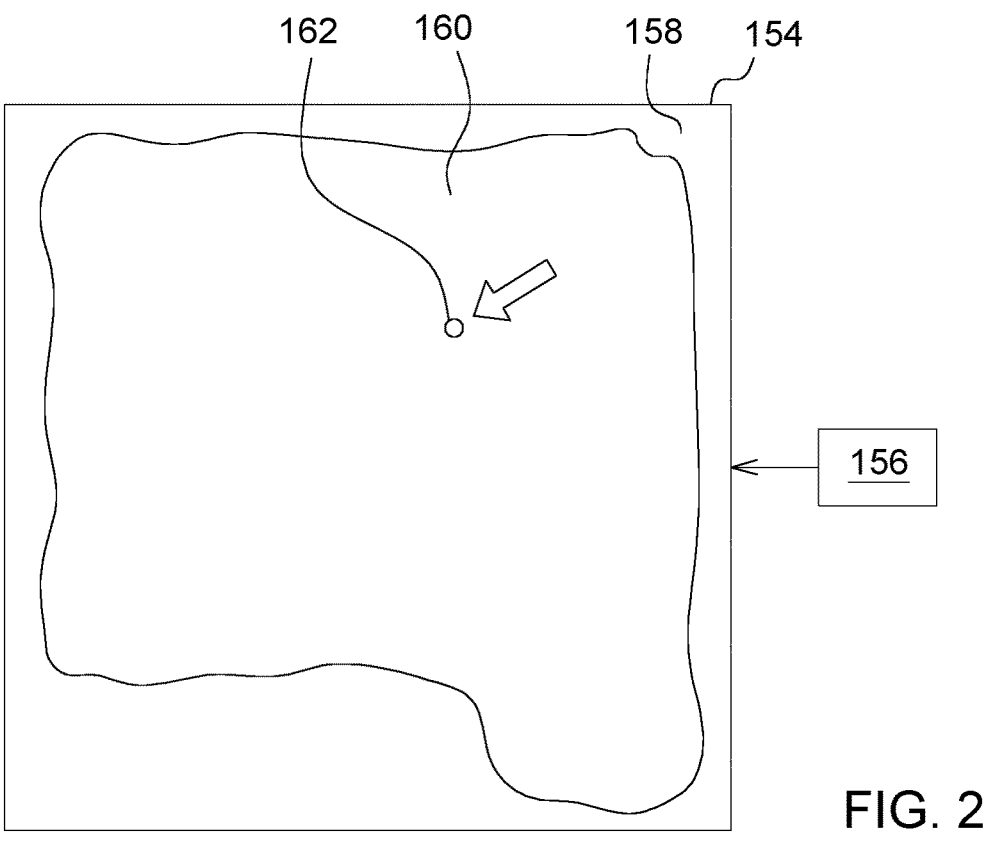
FIG. 2 is a graphical diagram representing a displayed map and a node (location) selection based on user input.
Figure 3:
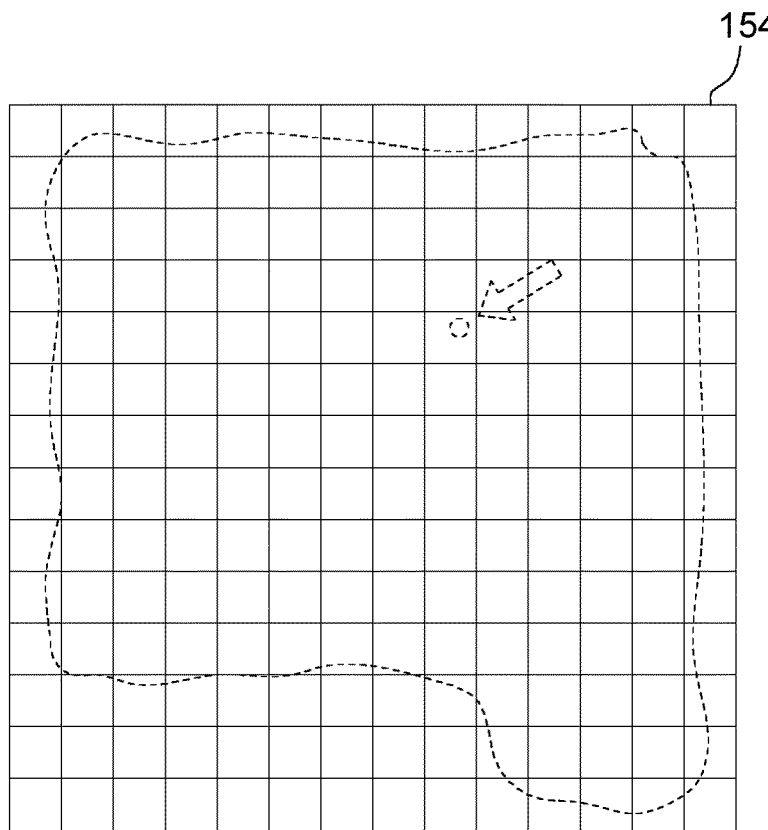
FIG. 3 is a graphical diagram representing the displayed map of FIG. 2 in the context of an underlying grid for correlating images and other data to locations in an embodiment as disclosed herein.
Figure 4:
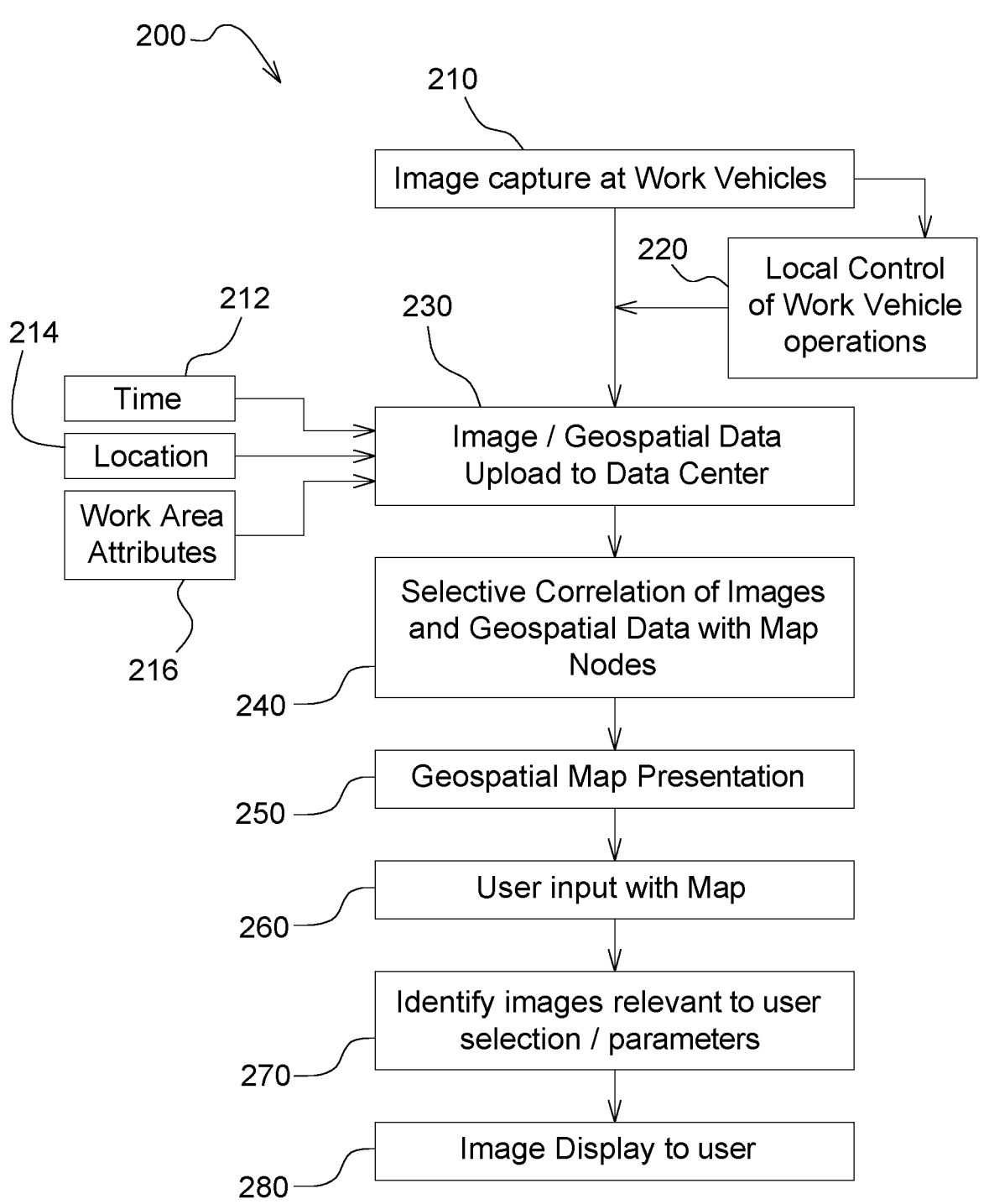
FIG. 4 is a flowchart representing an embodiment of a method as disclosed herein.

Referring next to FIG. 4, with further illustrative reference to FIGS. 1-3, an embodiment of a method 200 according to the present disclosure may be implemented for example by a system 100 as noted above or one or more components thereof. It may be understood that one or more of the illustrated steps in the method 200 may be omitted in some embodiments, unless otherwise specifically noted, and that in other embodiments the steps may be performed in a different order than is illustrated and is otherwise described below.

The method 200 may begin in step 210 with the capture of one or more images by at least one work vehicle. In various embodiments, the images are captured by the work vehicle in the standard course of operation within a work area, and without requiring additional equipment or altering or adjusting any existing equipment therefor. In other embodiments, existing perception sensors such as cameras may be utilized but for example selectively adjusted in position or orientation to capture images corresponding to a desired view of the work area within the scope of the present disclosure, in addition to and separate from a field of view as would be utilized in the standard course of operation within the work area.

In an embodiment, the captured images may in step 220 be utilized by the work vehicle for local control of work operations, such as for example steering control to avoid obstacles or to maintain a desired trajectory, to selectively spray a particular type of vegetation, to selectively adjust the position of a work implement attached to the vehicle, or the like. The captured images may in this context typically be processed and utilized via an onboard controller for this purpose, but in some embodiments (not shown) the one or more servers (e.g., host data center) or another computing device or system remote from the work vehicle may generate at least some control signals to the work vehicle based on analysis of the captured images.

The method 200 may continue in step 230 with the uploading of captured images, preferably with associated metadata or information from which such metadata is derivable, from the work vehicle to the one or more servers. The image capture and uploading process may in various embodiments be substantially continuous, periodic, event-based, or upon demand. For example, the one or more servers (e.g., host data center) may initiate image uploads based on determining that the work vehicle is in a particular location, or at specific times as may be needed to populate an internal database with appropriate images for the location or temporal geospatial parameters.

Event-based uploads may be similarly provided for example by storing triggers at the work vehicle level which initiate an upload to the one or more servers when the work vehicle arrives at the location, or in view of temporal geospatial parameters.

The work vehicle may collect and store captured images while in operation and tag or otherwise associate the images with relevant metadata, wherein event-based uploads may be provided to the one or more servers for example at the end of a workday.

The metadata or information from which such metadata is derivable may for example include geospatial data representative of a time 212 wherein the image was captured, a location 214 associated with the captured image (which may for example include global position coordinates, a direction of camera orientation, or the like), one or more work area attributes 216, etc. Work area attributes 216 may include information which is provided from the work vehicle, such as for example local user input, sensed values corresponding to materials being loaded, a ground surface being worked, etc., work vehicle operating parameters, or the like.

Work area attributes 216 may further or alternatively include information which is collected externally, such as for example from a third party database or user input, based on the images, the work vehicle, and/or a time 212 and/or location 214 associated with the captured images, such as for example associated work assignments, a crop growth stage, environmental conditions (e.g., weather, visibility), and the like.

For providing the location associated with the captured images, a controller associated with the work vehicle capturing the image may utilize a geographic position sensor such as for example a global navigation satellite system (GNSS) receiver that receives signals from a GNSS satellite transmitter. Geographic position sensor 204 can also include a real-time kinematic (RTK) component that is configured to enhance the precision of position data derived from the GNSS signal. The provided location may in addition include or be associated with a perspective/direction of the field of view, for example based on an orientation of the camera capturing the image, an orientation of the work vehicle, a slope of the ground surface upon which the work vehicle is traveling, or the like.

The method 200 may continue in step 240 with a selective correlation of the received images and the received, derived, or otherwise obtained geospatial data with respective nodes in a geospatial map. In an embodiment, the selective correlation may be as simple as populating a data structure such as a look-up table with images linked to a location or area, such that any subsequent selection of the location or area in the data structure retrieves any images linked therewith. In an embodiment a computer-based model may be provided or otherwise developed over time to correlate a first input data set comprising images from work vehicles with at least a second input data set comprising geospatial data (including but not limited to locations or areas), wherein the model may preferably optimize image selection for a given output based on user selection from among the geospatial data points. In an embodiment, a plurality of computer-based models may be provided or otherwise developed over time, with different image selection optimization results based on user-specified priorities among the geospatial data points.

In an embodiment, a geospatial map or corresponding data structure may be downloaded to or otherwise reside on the work vehicle, wherein the controller of the work vehicle may be configured to identify desired geospatial data and provide corresponding metadata along with each captured image before/when uploading to the one or more servers. Alternatively, or in addition, an operator at the work vehicle level may be presented with a user interface representing the data structure and prompting one or more user inputs as geospatial data to be provided along with a captured image. For example, an operator at the work vehicle level may be prompted to confirm that a captured image or series of images are in a specified direction, or include specified content, or are of a sufficient resolution to be useful, etc. The operator at the work vehicle level may be prompted for user input identifying or otherwise confirming a type of material being worked and visually represented in the captured image or series of images, an operation being performed, etc. The operator at the work vehicle level may be prompted to confirm details of previously uploaded geospatial data corresponding to the area currently being worked.

The uploaded images and corresponding metadata may accordingly be formatted at the work vehicle level to streamline processing at the server level for the selective correlation step.

In an embodiment, images may be uploaded to the one or more servers but without metadata or with some expected metadata missing therefrom, such as for example where a location is provided but no times of image capture or work area attributes as may for example be expected, wherein the one or more servers may be configured to estimate a time of image capture and/or selectively obtain third party data for correlation with the uploaded images as work area attributes. An estimated time may be specific to the time of the upload, or for example may be imprecise in nature, relating for example to an estimated time of day for a particular day in which the images were uploaded. Third party data in this context may relate to topographical characteristics of the work area, environmental information based on the time or date from third party weather services or the like, or may not necessarily be third party data but instead data obtained from other vehicles, devices, or personnel onsite at the same work area or general location. For example, the host data center may have previously received information regarding an operation of a first work vehicle that took place within the work area, wherein images captured from a second work vehicle after a period of time may be desirable to confirm or otherwise monitor the outcome of the operation of the first work vehicle, but without requiring corresponding metadata from the second work vehicle in order for work area attributes associated with the first operation to be correlated with the images from the second work vehicle.

The geospatial map, or a visual representation thereof, may be presented in step 250 to a user via a user interface. In an embodiment the user interface may in step 260 enable user input with respect to the visually represented geospatial map, or with respect to nodes associated with the geospatial map via for example position coordinates or other information from which a location may be derived or from which one or more images to be displayed may otherwise be selected. Based on the user input, the method 200 may proceed in step 270 to identify images relevant to the user selected node and optionally any associated selection parameters.

The images, alone or in combination with other information or metadata, may then be displayed for the user in step 280. In an embodiment, the user input and the displayed images are both provided using a web-based user interface generated on a remote computing device. In other embodiments, the user input may be separately provided or even predetermined. For example, the user input corresponding to a node selection as described above may be programmatically entered to the system based on a current or predicted location of a specified work vehicle or the equivalent. The user input may be stored as a selection to be applied at a given time, such as for example when the user next logs in to a relevant web interface tool. The user input may correspond to a particular work vehicle, a specified project, onsite personnel, or the like, wherein a current location thereof is designated as the node within the geospatial map for image retrieval.

In an embodiment, the geospatial map may include a look-up table, database, or the like for associating nodes such as locations with one or more images and/or metadata (e.g., time, location, work area attributes). As represented in an embodiment according to FIG. 2, the geospatial map 158 may be visually rendered for a geographical area such as for example including at least a portion of a work area 160, wherein user input from user interface 156 may specify a node (e.g., location) within the contours of the map 158.

One or more images may be selected based on the user input, for example as being in closest proximity to a location corresponding to the specified node in the geospatial map. As another example, various images may be associated with the specified node as a location, or within an appropriate distance from the location, but selection parameters may require that an image is selected as being the most recently uploaded, or uploaded at an equivalent time of year (e.g., crop growth stage), or other correlating factors that may produce a best fit for selection.

As represented in FIG. 3, the display of the geospatial map 158 on the display unit 154 may have underlying grid patterns, with user inputs being assigned to a particular grid node 162 and corresponding images being retrieved. As illustrated, the grid pattern constitutes squares, but in various embodiments, alternative geometric patterns may be utilized or the contours of the individual grid pattern elements may be dependent at least in part on the contours of the work area 160, natural physical boundaries, jurisdictional boundaries, etc.

A graphically represented geospatial map may be generated to include visual indicia for associated geospatial data, for example material and/or terrain characteristics in line with exemplary work area attributes as previously discussed, such as to represent product (e.g., crop) types, an amount of product worked or expected, whether the associated portion of the work area 160 has been worked, etc. In some embodiments, the user may be enabled to select a node within the represented geospatial map and further instruct that one or more images be retrieved and displayed as correlating to a portion of the work area having the same or equivalent work area attributes (e.g., material and/or terrain characteristics).

Accordingly, a visually represented geospatial map as a first display may enable user input regarding a location relative to a work area, optionally further including selection parameters relating to geospatial data such as time or work area attributes. A second display based on the user input may further provide visual images, for example to be used as context by a user such as a farm manager or agronomist to see detailed information associated with the work area and relating to the health, weed pressure, or growth stage of the crops therein. In the case of a construction worksite, for example, seeing visual information may provide useful context to the relevant user as to the current status of the work area.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of one or more functional components, logical components, and various processing steps, which may be comprised of one or more hardware, software, and firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described implementations.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example implementations of the present disclosure, these descriptions should not be viewed in a restrictive or limiting sense. Rather, there are several variations and modifications which may be made without departing from the scope of the appended claims.

What is claimed is:

1. A computer-implemented method for searchable integration of operating images and geospatial data, the method comprising:

uploading captured images from one or more perception sensors associated with a work vehicle traversing a work area and in the course of operations on a terrain thereof to a remote data storage device via a communications network;

determining geospatial data associated with each captured image, wherein the geospatial data for each captured image comprises first information representing a location of the work machine, second information representing a time when the image was captured, and third information representing one or more material and/or terrain characteristics of the work area at the time when the image was captured;

developing one or more computer-based models over time for selectively correlating a first data set comprising the uploaded images and a second data set comprising the geospatial data with respect to a geospatial map, for each of a plurality of user-selectable priorities for optimizing image selection, and further establishing a searchable data structure that links the captured images and associated geospatial data to corresponding geographic coordinates;

generating a first display on a display unit representing an overhead view of at least a portion of the work area;

responsive to user input via the first display corresponding to a selection of one or more nodes in the geospatial map, identifying at least one location within the work area corresponding to the selected one or more nodes in the geospatial map, and responsive to further user input specifying one or more priorities for optimized image selection from among the first, second, and third information of the geospatial data, identifying at least one of the uploaded images by reference to the one or more computer-based models and based on the specified one or more priorities; and generating a second display representing the identified at least one of the uploaded images on the display unit associated with the received user input.

2. The method of claim 1, comprising automatically controlling one or more of the operations of the work vehicle based at least in part on captured images from at least one of the one or more sensors.

3. The method of claim 2, wherein the work vehicle comprises a first work vehicle, the method further comprising automatically controlling one or more operations of a second work vehicle traversing the work area based at least in part on the captured images from the at least one of the one or more sensors associated with the first work vehicle.

4. The method of claim 1, wherein the plurality of user-selectable priorities for optimizing image selection comprise a requirement of a most recent uploaded image corresponding to the identified at least one location.

5. The method of claim 1, wherein the plurality of user-selectable priorities for optimizing image selection comprise a requirement of a most similar time with respect to seasonal and/or time of day attributes.

6. The method of claim 1, wherein the generated first display comprises indicia representing respective material and/or terrain characteristics of one or more portions of the work area.

7. The method of claim 6, further comprising:

identifying the at least one of the uploaded images as being nearest in location to the selected one or more nodes and further sharing at least one of the material and/or terrain characteristics of portions of the work area corresponding to the selected one or more nodes; and generating the second display on the display unit corresponding to the identified at least one of the uploaded images.

8. A computer-implemented system for searchable integration of operating images and geospatial data, the system comprising:

one or more servers functionally linked via a communications network to one or more work vehicles, and configured to:

upload captured images from one or more perception sensors associated with respective work vehicles while traversing a work area and in the course of operations on a terrain thereof to a remote data storage device;

determining geospatial data associated with each captured image, wherein the geospatial data for each captured image comprises first information representing a location of the work machine, second information representing a time when the image was captured, and third information representing one or more material and/or terrain characteristics of the work area at the time when the image was captured;

developing one or more computer-based models over time to selectively correlate a first data set comprising the uploaded images and a second data set comprising the geospatial data with respect to a geospatial map, for each of a plurality of user-selectable priorities for optimizing image selection, and further by establishing a searchable data structure that links the captured images and associated geospatial data to corresponding geographic coordinates;

generate a first display on a display unit representing an overhead view of at least a portion of the work area;

responsive to user input via the first display corresponding to a selection of one or more nodes in the geospatial map, identify at least one location within the work area corresponding to the selected one or more nodes in the geospatial map, and responsive to further user input specifying one or more priorities for optimized image selection from among the first, second, and third information of the geospatial data, identify at least one of the uploaded images by reference to the one or more computer-based models and based on the specified one or more priorities; and generate a second display representing the identified at least one of the uploaded images on the display unit associated with the received user input.

9. The system of claim 8, further comprising respective controllers associated with the work vehicles and configured to automatically control one or more of the operations thereof while traversing the work area based at least in part on captured images from at least one of the associated one or more sensors.

10. The system of claim 9, wherein the one or more servers are configured to provide the captured images or information derived from the captured images from the one or more sensors associated with a first work vehicle to the controller of a second work vehicle, and wherein the controller of the second work vehicle is configured to control one or more operations thereof while traversing the work area based at least in part on the captured images or information derived from the captured images from the one or more sensors associated with the first work vehicle.

11. The system of claim 8, wherein the plurality of user-selectable priorities for optimizing image selection comprise a requirement of a most recent uploaded image corresponding to the identified at least one location.

12. The system of claim 8, wherein the plurality of user-selectable priorities for optimizing image selection comprise a requirement of a most similar time with respect to seasonal and/or time of day attributes.

13. The system of claim 8, wherein the generated first display comprises indicia representing respective material and/or terrain characteristics of one or more portions of the work area.

14. The system of claim 13, wherein the one or more servers are configured to:

identify the at least one of the uploaded images as being nearest in location to the selected one or more nodes and further sharing at least one of the material and/or terrain characteristics of portions of the work area corresponding to the selected one or more nodes; and generate the second display on the display unit corresponding to the identified at least one of the uploaded images.

15. The method of claim 1, wherein captured images are selectively uploaded to the remote data storage device based on predetermined criteria for image transmission.

16. The method of claim 15, wherein the predetermined criteria comprise determining that a respective image satisfies specified image resolution and/or content requirements.

17. The method of claim 2, comprising controlling a respective orientation of the one or more perception sensors between first and second fields of view, wherein images collected with the first field of view are used for the automatically controlling one or more of the operations of the work vehicle, and wherein images collected with the second field of view are uploaded to the remote device.

18. The system of claim 8, wherein captured images are selectively uploaded to the remote data storage device based on predetermined criteria for image transmission.

19. The system of claim 18, wherein the predetermined criteria comprise determining that a respective image satisfies specified image resolution and/or content requirements.

20. The system of claim 9, wherein a respective orientation of the one or more perception sensors is controlled between first and second fields of view, wherein images collected with the first field of view are used for the automatically controlling one or more of the operations of the work vehicle, and wherein images collected with the second field of view are uploaded to the remote device.

\* \* \* \* \*